US006407894B1

(12) United States Patent
Bilac et al.

(10) Patent No.: US 6,407,894 B1
(45) Date of Patent: Jun. 18, 2002

(54) METHOD AND APPARATUS FOR DIFFERENTIALLY SENSING GROUND FAULT AND INDIVIDUAL PHASES

(75) Inventors: Mario Bilac, Lawrenceville; Jerry M. Green, Tucker, both of GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/435,186

(22) Filed: Nov. 5, 1999

(51) Int. Cl.$^7$ .................................................. H02H 3/28
(52) U.S. Cl. ............................ 361/44; 361/42; 361/93.1
(58) Field of Search ................................ 361/42–50, 78, 361/79, 91.1, 91.2, 93.1, 93.5, 93.6, 93.7

(56) References Cited

U.S. PATENT DOCUMENTS

| | | | |
|---|---|---|---|
| 3,848,159 A | * 11/1974 | Nye, Jr. et al. | 317/18 |
| 4,115,829 A | 9/1978 | Howell | 361/42 |
| 4,121,269 A | 10/1978 | Hobson, Jr. | 361/44 |
| 4,150,411 A | 4/1979 | Howell | 361/45 |
| 4,180,841 A | 12/1979 | Engel | 361/45 |
| 4,258,403 A | 3/1981 | Shimp | 361/42 |
| 4,347,540 A | * 8/1982 | Gary et al. | 361/47 |
| 4,631,622 A | 12/1986 | Howell | 361/45 |
| 4,641,216 A | 2/1987 | Morris et al. | 361/45 |
| 4,761,704 A | * 8/1988 | Fraisse et al. | 361/47 |
| 4,937,706 A | 6/1990 | Schueller et al. | 361/396 |
| 5,089,796 A | 2/1992 | Glennon et al. | 335/172 |
| 5,195,008 A | 3/1993 | Harr | 361/42 |
| 5,195,009 A | * 3/1993 | May | 361/44 |
| 5,331,301 A | 7/1994 | Glennon et al. | 335/20 |
| 5,436,785 A | * 7/1995 | Ferrazzi et al. | 361/42 |
| 5,982,136 A | * 11/1999 | Pelly | 363/35 |

FOREIGN PATENT DOCUMENTS

FR          002612348 A1  *  9/1988

* cited by examiner

Primary Examiner—Josie Ballato
Assistant Examiner—Robert L. Deberadinis

(57) ABSTRACT

An apparatus (110) (FIG. 1) for differentially sensing a ground fault in a power distribution circuit is configured to route a plurality of power signals, the power signals when summed resulting in a zero sum signal. The apparatus (110) includes a circuit element (e.g., a resistor) (128), first and second current transformers (CTs) (112, 114, 116), and a routing circuit (118). The first and second current transformers (112, 114, 116) are configured to sense first and second power signals and to generate first and second sense signals representative of the first and second power signals, respectively. The routing circuit (118) is configured to receive the first and second sense signals to provide a residual signal across the circuit element (128).

31 Claims, 2 Drawing Sheets

METHOD AND APPARATUS FOR DIFFERENTIALLY SENSING GROUND FAULT AND INDIVIDUAL PHASES

FIELD OF THE INVENTION

The present invention relates generally to the field of circuit breakers and more specifically to sensing ground fault and individual phases in a circuit breaker.

BACKGROUND OF THE INVENTION

Circuit breakers monitor a number of power conditions between a source and a load. While household circuit breakers sometimes only monitor overload conditions, industrial circuit breakers typically monitor overcurrent, short circuit, and ground fault conditions.

The total current flowing from the source through the circuit breaker to the load should be equal to the total current returning from the load through the circuit breaker to the source. A ground fault occurs when the current path between the load and the source is misdirected due to an anomaly in the circuit path. As a result, some of the current that flows through the circuit breaker to the load does not return through the normal ground path because it leaks to ground or returns along a different path than the rest of the current. For example, the current may leak to ground along the chassis of a motor. Ground faults can adversely affect the operation of appliances, or other electrical equipment, as well as the electrical network. If a ground fault occurs in a circuit supplying current to the three phase motor, the motor may begin vibrating because it is not receiving even levels of current from each phase.

Several methods of detecting a ground fault have been disclosed in the prior art. One method includes monitoring each of the phases in the distribution circuit using a microprocessor, converting sense signals representative of the power signal to digital form computationally, and summing the digitized signals to determine whether any imbalance exists among the signals. However, this method can introduce digitization errors into the signals which are cumulative as the power signals are summed. Furthermore, this method is complex and requires expensive circuitry and software programming to implement.

Accordingly, an improved method of and apparatus for sensing ground faults is needed which is simpler, more accurate and less expensive than prior methods. Further, there is a need for an efficient ground fault detection circuit which is not susceptible to digitization errors.

SUMMARY OF THE INVENTION

One embodiment relates to an apparatus for differentially sensing a ground fault in a power distribution circuit configured to route a plurality of power signals, the power signals when summed resulting in a zero sum signal. The apparatus includes a circuit element, first and second current transformers (CTs) and a routing circuit. The first and second current transformers are configured to sense first and second power signals and to generate first and second sense signals representative of the first and second power signals, respectively. The routing circuit is configured to receive the first and second sense signals and to provide a residual signal across the circuit element.

Another embodiment relates to a circuit breaker having a circuit for differentially sensing a ground fault in a power distribution circuit configured to route a plurality of power signals, the power signals when summed resulting in a zero sum signal. The circuit breaker includes a resistor, first means for sensing a first of the plurality of power signals and generating a first sense signal representative of the first power signal, and second means for sensing a second of the plurality of power signals and generating a second sense signal representative of the second power signal. The circuit breaker further includes a routing means for routing the first and second sense signals across the resistive element to provide a residual signal across the resistive element.

Another embodiment relates to a method for differentially sensing a ground fault in a power distribution circuit configured to route a plurality of power signals, the power signals when summed resulting in a zero sum signal. The method includes: sensing a first of the plurality of power signals; generating a first sense signal representative of the first power signal; sensing a second of the plurality of power signals; generating a second sense signal representative of the second power signal; routing the first and second sense signals across a circuit element to provide a residual signal across the circuit element.

BRIEF DESCRIPTION OF THE DRAWINGS

Exemplary embodiments will hereinafter be described with reference to the accompanying drawings, wherein like reference numerals refer to like elements, and.

DETAILED DESCRIPTION OF THE PREFERRED EMBODIMENTS

Figure 1:
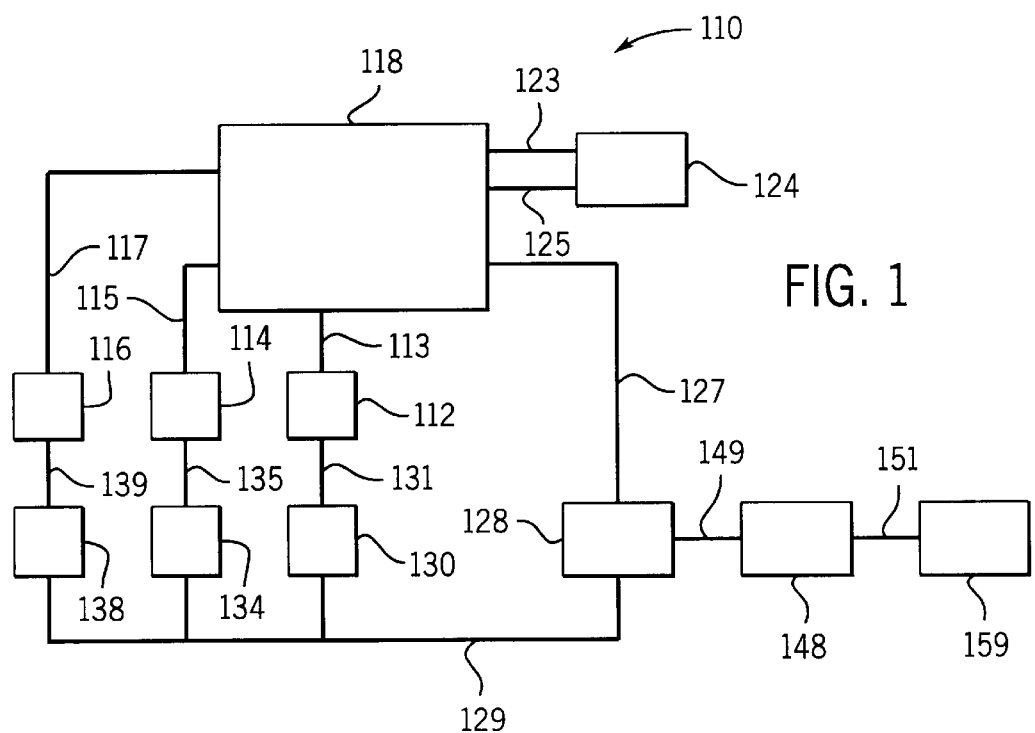
FIG. 1 is a block diagram of an apparatus for differentially sensing ground fault according to an exemplary embodiment.

Referring to FIG. 1, a circuit 110 for differentially sensing a ground fault in a power distribution circuit is disclosed. Circuit 110 includes current transformers (CTs) 112, 114, and 116. Each of current transformers 112, 114, and 116 is configured to sense one power signal of a three-phase power source. Specifically, each of current transformers 112, 114, and 116 is coupled around a line which receives an A phase portion, B phase portion, and C phase portion, respectively, of electrical power. An N-phase portion may also be included. A circuit breaker (not shown) provides the A, B, and C phase portions of electrical power, each 120 degrees out of phase with the others. Power signals through each of the lines induce a corresponding sense signal in each respective current transformer. Thus, current transformers 112, 114, and 116 can be current sources. Current transformers 112, 114, and 116 could alternatively be other similar devices for detecting current in a line.

Circuit 110 further includes a routing circuit 118 coupled to current transformers 112, 114, and 116 configured to route sense signals received along lines 113, 115, and 117. Circuit 110 further includes a composite circuit 124 and a residual circuit 128. Routing circuit 118 routes the sense signals via lines 123, 125 to composite circuit 124 to generate a composite of the sense signals. Composite circuit 124 includes a circuit element (e.g., a resistor) configured to receive the sense signals. The composite signal comprises the three sense signals, full-wave rectified, and summed, to provide a sense signal having a direct current (DC) component. Routing circuit 118 further routes the sense signals via line 127 to residual circuit 128 to generate a residual of the sense signals. Residual circuit 128 includes a circuit element (e.g., a resistor) configured to receive the sense signals. The residual signal comprises the three sense signals, 120 degrees out of phase, and summed, to provide a sense signal equal to zero during normal operation.

Circuit 110 further includes a signal conditioning circuit 148 coupled along line 149 to residual circuit 128. Conditioning circuit 148 receives the residual signal from circuit 128, amplifies the residual signal, and provides the residual signal along line 151 to a monitoring circuit 159. Monitoring circuit 159 monitors the residual signal and determines whether a trip condition exists. Signal conditioning circuit 148 may include, for example, an amplifier. Monitoring circuit 159 may include, for example, a microprocessor or other control circuitry.

Circuit 110 further includes individual phase circuits 130, 134, and 138 coupled between residual resistor 128 and current transformers 112, 114, and 116. The residual signal is provided along a line 129 to each of phase circuits 130, 134, and 138, which separate the A phase, B phase, and C phase portions of the residual signal back into their respective components, and provide the respective components along lines 131, 135, and 139 to current transformers 112, 114, and 116, respectively. Additionally, signal conditioning circuits may be coupled to each of individual phase circuits 130, 134, and 138 to sense the individual phase signals thereon and provide the individual phase signals to monitoring circuit 159. Also, a signal conditioning circuit may be coupled to composite circuit 124 to sense the composite signal thereon and provide the composite signal to monitoring circuit 159.

Figure 2:
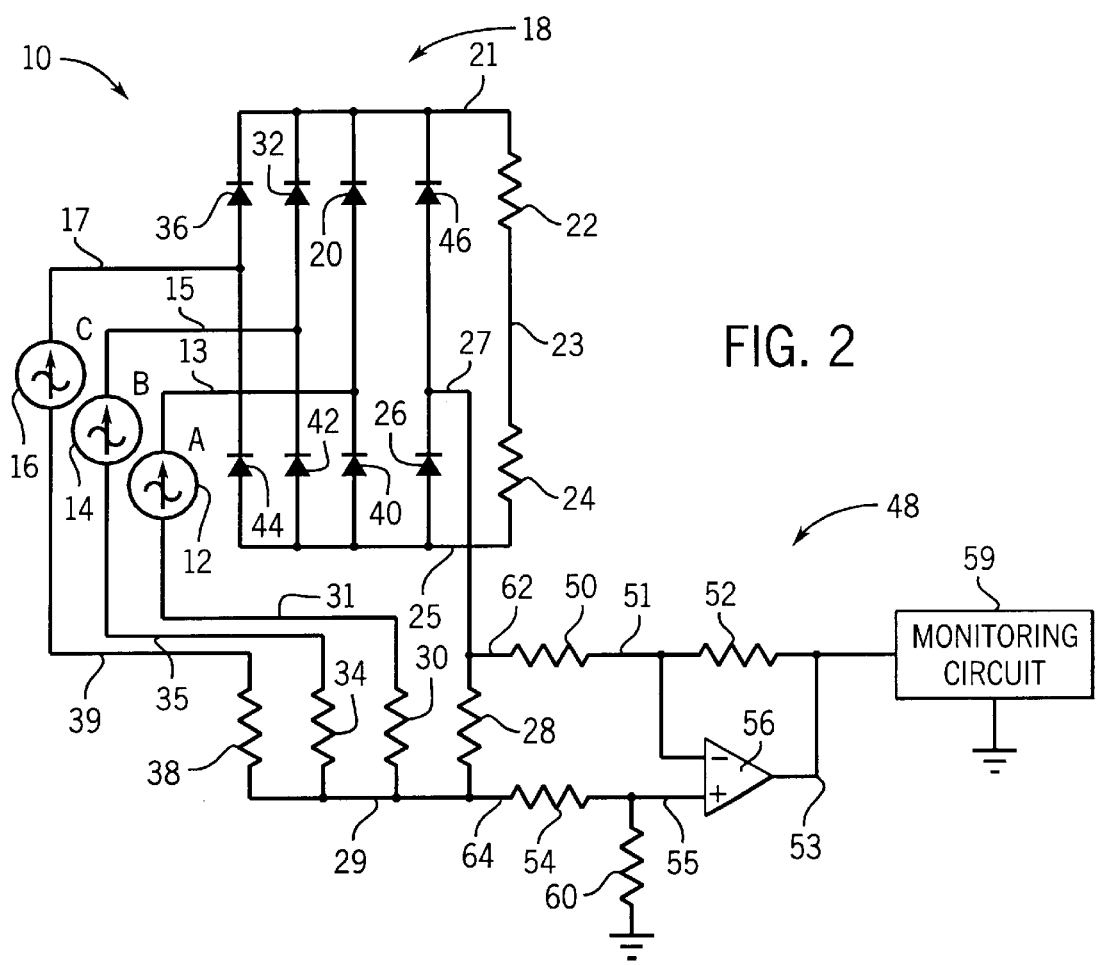
FIG. 2 is an electrical schematic diagram of the exemplary embodiment of FIG. 1.

Referring now to FIG. 2, an alternate embodiment of circuit 110 is shown. Circuit 10 includes a routing circuit 18 comprising diodes 20, 26, 32, 36, 40, 42, 44, and 46 and resistors 22, 24, 30, 34, and 38. Circuit 10 further includes a signal conditioning circuit 48 including terminals 62, 64, resistors 50, 52, an operational amplifier 56 and resistors 54 and 60. Operational amplifier 56 is in a differential configuration. Diodes 20, 26, 32, 36, 40, 42, 44, and 46 may alternatively by other switching elements; resistors 22, 24, 30, 34, and 38 may alternatively be other resistive elements; and operational amplifier 56 may alternatively be any type of discrete component or components which operates as an analog or digital amplifier.

Routing circuit 18 is configured to route the sense signals from current transformers 12, 14, and 16 across a single resistive element 28 (e.g., a resistor) to provide a differential signal across the resistive element, as will now be described. During the positive half cycle of the AC waveform of current transformer 12 (A phase), current flows along line 13 through diode 20, along line 21 through resistor 22, along line 23 through resistor 24, along line 25 through diode 26, along line 27 through resistor 28, along line 29 through resistor 30 and returns to current transformer 12 along line 31. During the negative half cycle of the AC waveform of current transformer 12, current flows along line 31 through resistor 30, along line 29 through resistor 28, along line 27 through diode 46, along line 21 through resistor 22, along line 23 through resistor 24, along line 25 through diode 40 and returns along line 13 to current transformer 12. During the positive half cycle of the AC waveform of current transformer 14 (B phase), current flows along line 15 through diode 32, along line 21 through resistor 22, along line 23 through resistor 24, along line 25 through diode 26, along line 27 through resistor 28, along line 29 through resistor 34 and returns along line 35 to current transformer 14. During the negative half cycle of the AC waveform of current transformer 14, current flows along line 35 through resistor 34, along line 29 through resistor 28, along line 27 through diode 46, along line 21 through resistor 22, along line 23 through resistor 24, along line 25 through diode 42 and returns along line 15 to current transformer 14. During the positive half cycle of the AC waveform of current transformer 16 (C phase), current flows along line 17 through diode 36, along line 21 through resistor 22, along line 23 through resistor 24, along line 25 through diode 26, along line 27 through resistor 28, along line 29 through resistor 38 and returns along line 39 to current transformer 16. During the negative half cycle of the AC waveform of current transformer 16, current flows along line 39 through resistor 38, along line 29 through resistor 28, along line 27 through diode 46, along line 21 through resistor 22, along line 23 through resistor 24, along line 25 through diode 44 and returns along line 17 to current transformer 16.

Accordingly, sense signals from phase A, phase B, and phase C all flow through resistor 28, thereby providing a full-wave, differential, residual signal across residual resistor 28. The signal is full-wave due to the diode configuration of routing circuit 18. The signal is differential because it is received on terminals 62, 64 without a ground reference. The signal is residual because it will indicate any residual current which is lost in the distribution circuit, as will now be described. The sum of these sense signals is equal to zero because the A phase, B phase, and C phase power signals are all 120 degrees out of phase with one another, and because the sense signals across resistor 28 corresponding to the three phase power signals are full-wave signals. Thus, the residual signal will equal zero voltage, zero current when all of the current flowing along line inputs A, B, and C from source to load returns from load to source. If the residual signal is not equal to zero voltage, zero current, a residual ground fault may exist because one or more of the three phase distribution circuits includes an anomaly which causes the current traveling from load to source to be different than that traveling from source to load.

A full-wave rectified, composite signal is provided on composite resistor 24. The signal is full-wave rectified due to the configuration of routing circuit 18. Because the sense signals for all phases A, B, and C are cumulative on composite resistor 24, regardless of the phase angle, all sense signals will sum, creating a composite signal having a DC component.

A conditioning circuit 48 includes first and second terminals 62, 64 coupled to opposing ends of resistor 28 to receive the differential signal. In this exemplary embodiment, sensing circuit 48 includes an amplifier in a differential configuration. Terminal 62 is coupled through resistor 50 to the inverting input 51 of amplifier 56. Resistor 52 couples the inverting input of amplifier 56 to the output 53 of amplifier 56. Terminal 64 is coupled through resistor 54 to the non-inverting input 55 of amplifier 56. Resistor 60 couples non-inverting input 55 of amplifier 56 to ground. In operation, conditioning circuit 48 is configured to receive the differential signal across residual resistor 28, amplify the signal, and provide the signal to monitoring circuit 59. Further amplifying or attenuating stages may be provided in signal conditioning circuit 48.

A monitoring circuit 59 which is coupled to the output 53 of signal conditioning circuit 48 monitors the residual signal and determines a residual ground fault when the residual signal exceeds a predetermined residual trip value. For example, monitoring circuit 59 declares a residual ground fault when the residual signal exceeds 40% of the total phase current flowing through current transformers 12, 14, and 16.

In response, monitoring circuit 59 sends a signal to trip the circuit breaker.

Figure 3:
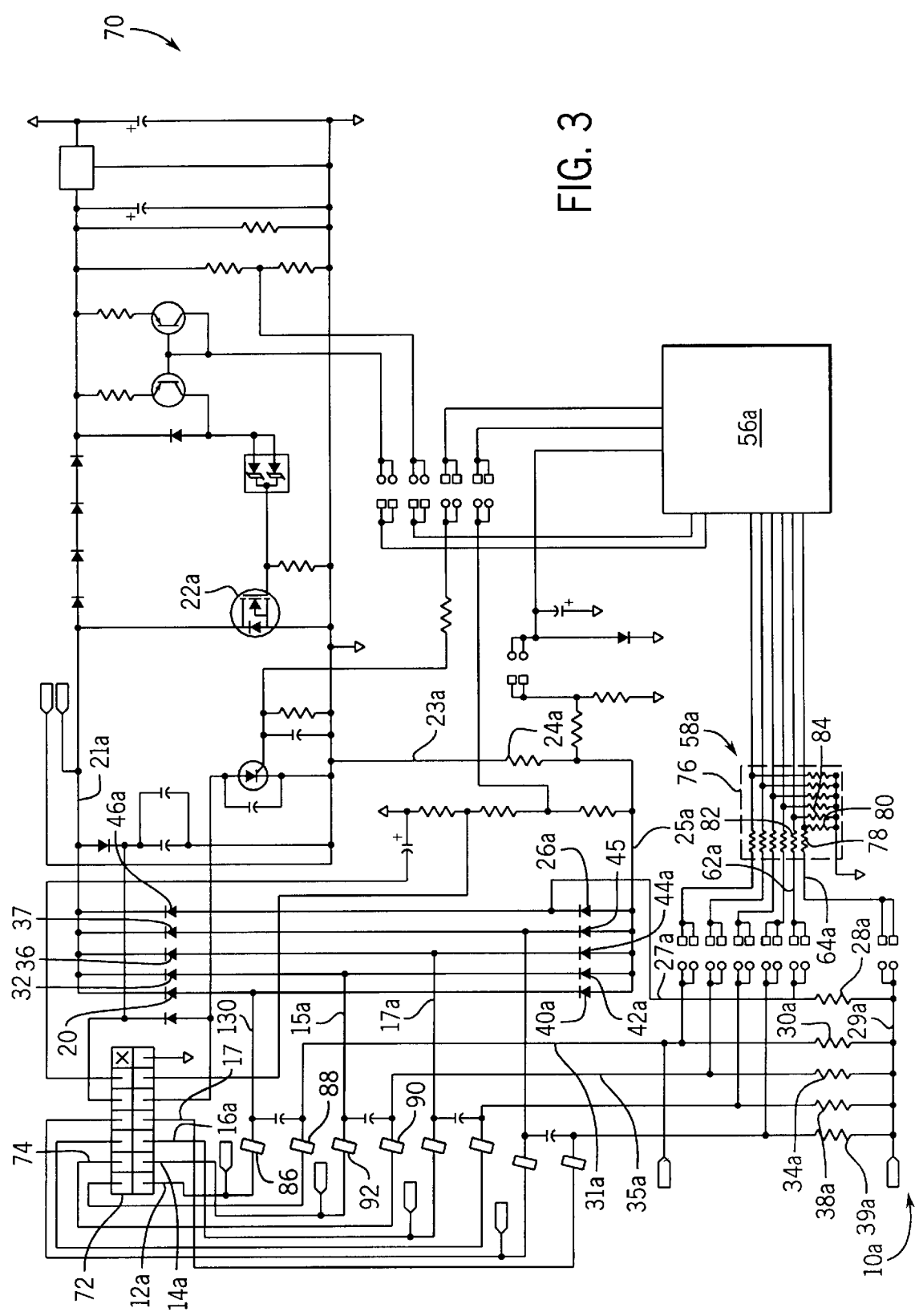
FIG. 3 is an electrical schematic diagram of a portion of a circuit breaker according to an alternative embodiment.

Referring now to FIG. 3, a portion 70 of a circuit breaker is disclosed including a circuit 10a according to an alternative embodiment. Analogous components between circuit 110 (FIG. 1) and circuit 10a are indicated by the "a" suffix in FIG. 3. Note the inclusion in this embodiment of an N-pole terminal 17. A port 72 is coupled to a current transformer harness (not shown) which couples the A, B, C, and N-current transformers (not shown) to terminals 12a, 14a, 16a, and 17, respectively.

The function of circuit 10a will now be described assuming a two-phase system comprising an A phase and a B phase, 180 degrees out of phase. Current through the A phase current transformer (i.e., the A phase sense signal) flows to terminal 12a, through a ferrite bead 86 for noise reduction, along line 31a through diode 20a, to a power rail 21a. Power rail 21a receives power from all current transformers and powers the control circuitry of the circuit breaker, some of which is shown in FIG. 3. The A phase sense signal flows through transistor 22a, along line 23a through resistor 24a (e.g., a one Ohm resistor), along line 25a through diode 26a, along line 27a through resistor 28a (e.g., a one Ohm resistor), along line 29a through resistor 30a (e.g., a one Ohm resistor) and returns along line 31a through a second ferrite bead 88 to the A phase current transformer (not shown). While the A sense signal is traveling this path, the B sense signal, 180 degrees out of phase, is traveling from terminal 74 through ferrite bead 90, along line 35a through resistor 34a (e.g., a one Ohm resistor), along line 29a through resistor 28a, along line 27a through diode 46a, along line 21a through transistor 22a, along lines 23a through composite resistor 24a, along line 25a through diode 42a, along line 15a through ferrite bead 92 and returns along terminal 14a to B phase current transformer (not shown).

Thus, A phase sense signal is going through resistor 28a in one direction while B phase sense signal is going through resistor 28a in the opposite direction. If the magnitudes of the A phase and B phase sense signals are the same, the signals will cancel at resistor 28a leaving a residual signal of zero. This indicates that all of the current in the A phase line going from source to load is being returned and all of the current in the B phase line going from load to source is being returned and, thus, no ground fault condition exists. If the current going out of the A phase is leaking, for example, along a motor chassis to a ground, the residual signal will not be equal to zero, indicating a ground fault condition.

Current through the C phase current transformer and N-phase current transformer flow analogously to that of the B phase current transformer through their respective diodes and resistors in a three-phase implementation of circuit 10a. Also, individual phase signals are provided over each of resistors 30a (A phase), 34a (B phase), 38a (C phase), and 39a (N-phase).

Circuit 70 further includes a voltage divider 58a including five 3.0 kOhm resistors, each coupling one terminal of each of resistors 28a, 30a, 34a, 38a, and 39a to a first terminal of an application specific integrated circuit (ASIC) 56a. The other terminal of resistors 28a, 30a, 34a, 38a, and 39a are coupled through a sixth 3.0 kOhm resistor to a second terminal of ASIC 56a. Voltage divider 58a also includes six 600 Ohm resistors coupled between ground and the 3.0 kOhm resistor terminals coupled to ASIC 56a. Voltage divider 58a serves to attenuate the signals across resistors 28a, 30a, 34a, 38a, 39a and provide them differentially to ASIC 56a.

ASIC 56a includes an amplifier circuit coupled to resistor 28a and further includes amplifiers for each of resistors 30a, 34a, 38a, 39a. Thus, ASIC 56a senses both the residual signal across resistor 28a and the individual phase signals across 30a, 34a, 38a, and 39a. The signals across resistors 28a, 30a, 34a, 38a, and 39a are amplified and processed in ASIC 56a for use by other control circuitry in the circuit breaker. ASIC 56a amplifies the sense signals such that they are suitable for subsequent processing by a microprocessor, for example, through an analog-to-digital input of the microprocessor. In this embodiment, ASIC 56a amplifies the signals with a programmable amplifier arrangement as disclosed in commonly assigned U.S. patent application Ser. No. 09/435,110 entitled "Circuit Breaker Having Programmable Amplifier" by Bilac, herein incorporated by reference.

The microprocessor (not shown) monitors the differential, amplified, residual signal to determine if a residual ground fault occurs, and, if so, provides a trip unit signal to trip the circuit breaker. ASIC 56a also provides a positive DC bias to the differential signal received from resistor 28a at a predetermined voltage (e.g., 2.5 Volts) to allow sensing movement of the differential signal in both positive and negative directions.

While the embodiments illustrated in the FIGS. and described above are presently preferred, it should be understood that these embodiments are offered by way of example only. For example, the circuitry for sensing ground fault and individual phases may alternatively be part of a sensing circuit which is not part of a circuit breaker. The invention is not limited to a particular embodiment, but extends to various modifications that nevertheless fall within the scope of the appended claims.

What is claimed is:

1. An apparatus for differentially sensing a ground fault in a power distribution circuit configured to route a plurality of power signals, the power signals when summed resulting in a zero sum signal, comprising:
   a circuit element;
   a first current transformer configured to sense a first of the plurality of power signals and to generate a first sense signal representative of the first power signal;
   a second current transformer configured to sense a second of the plurality of power signals and to generate a second sense signal representative of the second power signal; and
   a routing circuit configured to receive the first and second sense signals and to provide a full-wave residual signal across the circuit element.

2. The apparatus of claim 1, further comprising a signal conditioning circuit configured to receive the residual signal, amplify the residual signal, and provide the amplified residual signal to an output terminal.

3. The apparatus of claim 2, further comprising a voltage divider coupled between the circuit element and the signal conditioning circuit, the voltage divider configured to attenuate the residual signal.

4. The apparatus of claim 2, wherein the conditioning circuit is configured to provide a positive DC bias to the residual signal.

5. The apparatus of claim 2, wherein the routing circuit comprises an individual phase circuit in series with the first current transformer, wherein the signal conditioning circuit is coupled to the individual phase circuit and configured to receive an individual phase signal from the individual phase circuit.

6. The apparatus of claim 5, wherein the routing circuit comprises a first terminal coupled to one end of the individual phase circuit and a second terminal coupled to a second end of the individual phase circuit, the second terminal coupled to the circuit element.

7. The apparatus of claim 1, wherein the circuit element includes a resistor.

8. The apparatus of claim 1, further comprising:
a third current transformer configured to sense a third of the plurality of power signals and to generate a third sense signal representative of the third power signal, the routing circuit configured to receive the first, second, and third sense signals and to provide the residual signal across the circuit element.

9. The apparatus of claim 8, wherein the full-wave residual signal equals zero voltage, zero current when all of the current flowing from the first, second, and third current transformers is routed across the circuit element.

10. The apparatus of claim 1, wherein the routing circuit includes a plurality of diodes configured to provide the first and second sense signals in full-wave form across the resistive element.

11. The apparatus of claim 1, further comprising a monitoring circuit coupled to the signal conditioning circuit, the monitoring circuit configured to monitor the sensed residual signal.

12. The apparatus of claim 11, wherein the monitoring circuit declares a residual ground fault when the monitored signal exceeds a predetermined percentage of total current in the plurality of power signals.

13. The apparatus of claim 1, wherein the routing circuit is further configured to provide a composite signal across a composite circuit.

14. The apparatus of claim 1, wherein the residual signal is a differential signal.

15. A circuit breaker having a circuit for differentially sensing a ground fault in a power distribution circuit configured to route a plurality of power signals, the power signals when summed resulting in a zero sum signal comprising:
a resistor;
first means for sensing a first of the plurality of power signals and generating a first sense signal representative of the first power signal;
second means for sensing a second of the plurality of power signals and generating a second sense signal representative of the second power signal; and
routing means for routing the first and second sense signals across the resistive element to provide a residual signal across the resistive element, wherein the resistor is disposed outside of the routing means.

16. The circuit breaker of claim 15, further comprising signal conditioning means for amplifying the residual signal.

17. The circuit breaker of claim 16, the signal conditioning means comprising an amplifier means for amplifying the residual signal.

18. The circuit breaker of claim 17, further comprising a divider means coupled between the resistive element and the amplifier means for attenuating the residual signal.

19. The circuit breaker of claim 16, the signal conditioning means providing a positive DC bias to the residual signal.

20. The circuit breaker of claim 15, further comprising an individual phase circuit means in series with the first means, the signal conditioning means receiving the individual phase signal across the individual phase circuit means.

21. The circuit breaker of claim 15, further comprising a monitoring circuit means for determining a residual ground fault when the monitored signal exceeds a predetermined percentage of total current in the plurality of power signals.

22. The circuit breaker of claim 15, further comprising a composite circuit means coupled to the routing means for providing a composite signal based on the first and second sense signals.

23. The circuit breaker of claim 15, wherein the residual signal is a differential signal.

24. A method for differentially sensing a ground fault and for sensing individual phases in a power distribution circuit configured to route a plurality of power signals, the power signals when summed resulting in a zero sum signal, comprising:
sensing a first of the plurality of power signals;
generating a first sense signal representative of the first power signal;
sensing a second of the plurality of power signals;
generating a second sense signal representative of the second power signal;
routing the first and second sense signals across a circuit element to provide a residual signal across the circuit element;
providing the first and second sense signals to first and second phase circuits; and
sensing the individual phases of the first and second sense signals at the first and second phase circuits.

25. The method of claim 24, further comprising amplifying the residual signal.

26. The method of claim 24, further comprising providing a positive DC bias to the residual signal.

27. The method of claim 24, wherein the residual signal is a full-wave residual signal.

28. The method of claim 24, further comprising declaring a residual ground fault when the monitored signal exceeds a predetermined percentage of total current in the plurality of power signals.

29. The method of claim 24, further comprising routing the first and second sense signals across a composite circuit, the composite circuit providing a composite signal based on the first and second sense signals.

30. The method of claim 24, wherein the residual signal is a differential signal.

31. The method of claim 24, further comprising monitoring the individual phases of the first and second power supplies.

* * * * *